United States Patent [19]
Andrea

[11] Patent Number: 5,584,160
[45] Date of Patent: Dec. 17, 1996

[54] DEVICE FOR FEEDING ARTICLES TO A PACKAGING LINE THAT INSERTS THE ARTICLES INTO RESPECTIVE CONTAINERS

[75] Inventor: Melchiorri Andrea, Pontelagoscuro, Italy

[73] Assignee: I.M.A. Industria Macchine Automatiche S.p.A., Ozzano Emilia, Italy

[21] Appl. No.: 545,235

[22] Filed: Oct. 19, 1995

[30] Foreign Application Priority Data

Oct. 19, 1994 [IT] Italy ................... BO94A0461

[51] Int. Cl.⁶ ................... B65B 5/00
[52] U.S. Cl. ............. 53/251; 53/566; 198/345.3
[58] Field of Search ............. 53/251, 252, 566; 198/803.01, 465.1, 345.3, 343.2

[56] References Cited

U.S. PATENT DOCUMENTS

| | | | |
|---|---|---|---|
| 3,333,396 | 8/1967 | Paal et al. ................... | 53/252 |
| 4,088,220 | 5/1978 | Jacksch et al. ................... | 198/343.2 |
| 4,588,067 | 5/1986 | Brems ................... | 198/345.3 |
| 4,712,670 | 12/1987 | Burkhardt ................... | 198/465.1 |
| 5,226,524 | 7/1993 | Guttinger et al. ................... | 198/345.3 |

FOREIGN PATENT DOCUMENTS

| | | | |
|---|---|---|---|
| 0244231 | 11/1987 | European Pat. Off. . | |
| 1461921 | 2/1969 | Netherlands . | |
| 2214479 | 9/1989 | United Kingdom ................... | 198/345.3 |

*Primary Examiner*—John Sipos
*Assistant Examiner*—John Paradiso
*Attorney, Agent, or Firm*—McAulay Fisher Nissen Goldberg & Kiel, LLP

[57] ABSTRACT

The device is for feeding articles to a packaging line that inserts the articles into respective containers, and includes a continuously moving supplementary line that transfers articles to the packaging line. The supplementary line is equipped with a plurality of holders, removably fastened to a conveyor of the same line by connecting means. The articles are supplied to the holders by an article feeding line, at a loading station. Raising means release the connecting means from the conveyor at the loading station, so as to temporarily stop the holder to be loaded.

15 Claims, 8 Drawing Sheets

DEVICE FOR FEEDING ARTICLES TO A PACKAGING LINE THAT INSERTS THE ARTICLES INTO RESPECTIVE CONTAINERS

BACKGROUND OF THE INVENTION

The present invention relates to packaging articles which are inserted into respective containers, such as cases and the like.

DESCRIPTION OF THE PRIOR ART

It is known that automatic packaging machines generally introduce articles into respective containers.

The articles supplied by a conveying line are usually regularly spaced apart, and distance between each article and the following one suitably matches the distance between two adjacent containers which are conveyed alongside by the packaging line. Generally, the packaging line moves continuously and the articles are then inserted into the containers by suitable pusher means, acting e.g. according to a direction transversal to the packaging line.

Known feeding devices are usually equipped with U-shaped holders aimed at receiving the articles that are subsequently introduced into the containers.

These holders convey the articles in a regular fashion and, since they are arranged parallel to the packaging line, allow guided introduction of the articles into the containers.

The drawback of the above mentioned devices results from the difficulty to introduce correctly the articles into the moving holders, without stopping the continuous movement of the conveying line.

It is obvious that an intermittent movement would allow delivering the articles in the best way, that means transferring each one of them during a stop, but this solution would also reduce the machine throughput and versatility.

Many solutions of the problem have been proposed, including, for instance, means that grip the articles and convey them while reaching, during the loading stage, the same speed of the conveying holders.

In particular, the are known feeding devices provided with magazines and made to oscillate over the holders conveying line; each magazine features a suitable escapement mechanism that releases the articles and that is activated when the magazine moves in registry with a holder to be filled.

It is obvious that this solution brings to a reduction of the feeding rate, since each feeding step depends on the time necessary for the magazine to perform a complete oscillation cycle.

To overcome this disadvantage, feeding devices have been supplied with two or more oscillating magazines, working in regular sequence. However, this solution causes increase of the machine cost and complexity, and requires very short time in the passage of each article from the magazine to the holder.

Another known solution uses a fixed magazine that is placed over the holders conveying line and that delivers the articles by dropping them when each holder passes therebelow. In this case, the holders must be bigger than the articles in order to facilitate articles introduction.

Another facilitation results from the use of holders with movable sides that are kept suitably spaced apart when the articles are received and then are moved closer until the size of the article is met.

The above mentioned solutions are mechanically complex and are not reliable.

At present, there is still the problem of providing fixed feeding devices, scarcely compatible with continuous movement of the line to be fed, or alternatively movable feeding devices, that, during the loading stage, must move with the speed of the holders conveying line.

SUMMARY OF THE INVENTION

The object of the present invention is to provide an improved device that allow feeding the articles in the best way delivering them to a packaging line operated in stepless way. The above mentioned object are obtained by means of a device for feeding articles to a line for packaging them into respective containers, that includes a continuously moving supplementary line that transfers articles to the packaging line (4) with a plurality of carrier holders, removably fastened by respective connecting means to conveying means provided in the supplementary transferring line. The holders receive respective articles from a feeding line at a loading station, and there are raising means aimed at releasing the connecting means from the conveying means when the holder is in the loading station, so as to stop momentarily the holder to be loaded.

BRIEF DESCRIPTION OF THE DRAWINGS

The characteristic features of the present invention are pointed out in the following description with reference to the enclosed drawings, in which:

FIG. 11 shows an enlarged sectional view taken along the line XI—XI of FIG. 10a.

DESCRIPTION OF THE PREFERRED EMBODIMENT

With reference to the above described drawings, a feeding line 1 supplies the articles 2 which are to be packed in respective containers 3 carried along a stepless moving packaging line 4.

The feeding line brings the articles 2, one by one to a stop member 5 located at a loading station where the articles are pushed onto a supplementary transferring line 6 aimed at conveying them.

At the loading station a reciprocating actuator 8, that reciprocates in a direction transversal to the feeding line 1, moves a pusher 7 that cooperates with the same line 1.

The supplementary transferring line 6 features a plurality of holders 9 moved by a chain conveyor 10; the chain 10 is turned around a pair of sprockets 11 and is moved continuously in the direction indicated by the arrow A, so that in its active run concurs with the movement direction of the packaging line 4 and the speed is equal to the speed of the same packaging line 4.

The holders 9 receive articles 2 to be packed, which are then introduced into relative containers 3 by a transferring device 12 featuring e.g. a plurality of pusher means 13 that act on the articles 2.

The pusher means 13 are fastened, in substantially known way, to flexible driving means 14, e.g. a chain, operated in such a way as to determine a zero speed for the pusher means 13 with respect to the articles 2, considering the line movement direction, during the transferring stage.

The holders 9 are removably fixed to the chain conveyor 10 by connecting means 15, which engage a series of supports 16, fixed, regularly spaced apart, to the chain conveyor 10.

The number of the supports 16 is twice the number of the holders 9, minus one. Consequently, the holders 9 are regularly spaced apart and the distance between them is equal to the double distance between the supports 16.

Because the holders are arranged alternatively on the supports (that is only one of two adjacent supports is connected with one holder), there is a pair of adjacent holders which are necessarily connected with two adjacent supports and the free space between them is thus eliminated.

As seen in FIGS. 3, 4, 5 and 6, the connecting means 15 include a carriage 17 fastened to the lower part of each holder 9.

The carriage 17 has two pairs of rollers 18, by means of which it slidably runs along two guides 19 made in the sides 20 of the supplementary transferring line 6. The two guides follow the course of the chain conveyor 10 in a ring path.

The carriage 17 has also a stem 21 whose opposed ends run in respective slots 22 made in the sides of the carriage and which are perpendicular to the advancement direction.

At its ends, the stem 21 features flattenings 21a that engage the slots 22 with no possibility to rotate for the stem. Helical springs 23, located in the carriage 17, acts on the ends of the stem 21 so as to push the stem 21 toward the chain conveyor 10.

The stem 21, when it is in a connecting position, engages an upper groove 24 made in a corresponding support 16. The groove 24 is formed in a block 25 that is fastened to the chain 10 by means of a pair of square elements 26.

The stem 21 can be released from the groove 24 of the support 16 by a pair of reciprocating fork-like raising means 27 which are located at the loading station of the supplementary transferringline 6. As seen in particular in FIGS. 3 and 5, during transport of the holder 9 the stem 21 of the related connecting means 15 engages firmly the groove 24 of a respective support 16 of the chain conveyor 10.

Figures 3, 6:
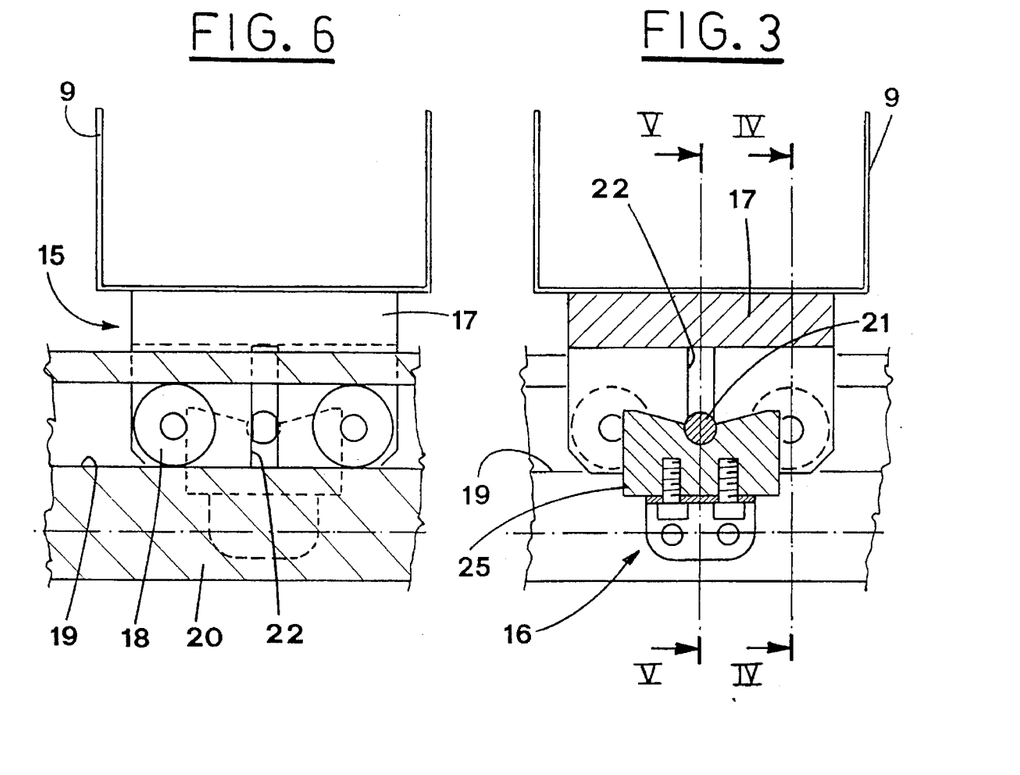
FIG. 3 shows a longitudinal section view of a particular of the subject device.
FIG. 6 shows a sectional view taken along the line VI—VI of FIG. 4.
Figure 4:
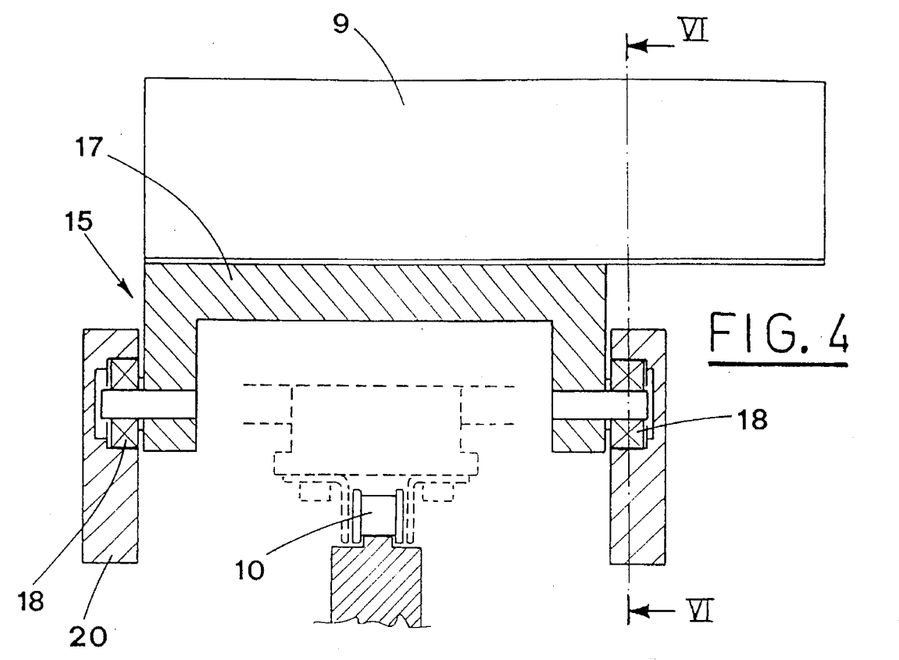
FIGS. 4 and 5 show sectional views taken along the lines IV—IV and V—V of FIG. 3, respectively.
Figure 5:
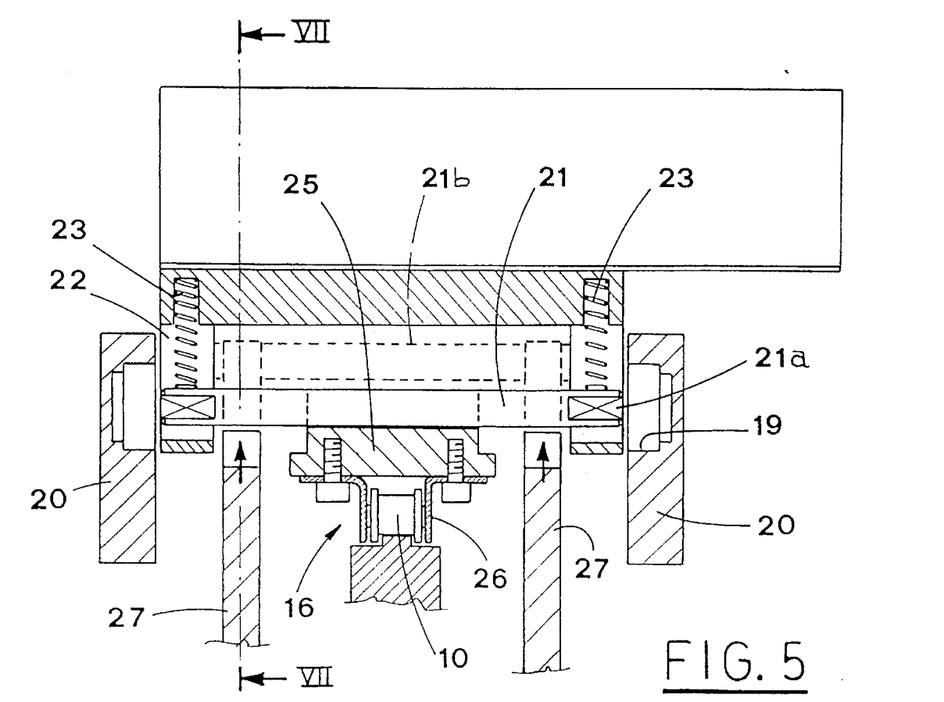

Therefore, the holders 9 are yieldingly connected to the chain conveyor and move continuously along the supplementary transferringline 6.

Figure 1:
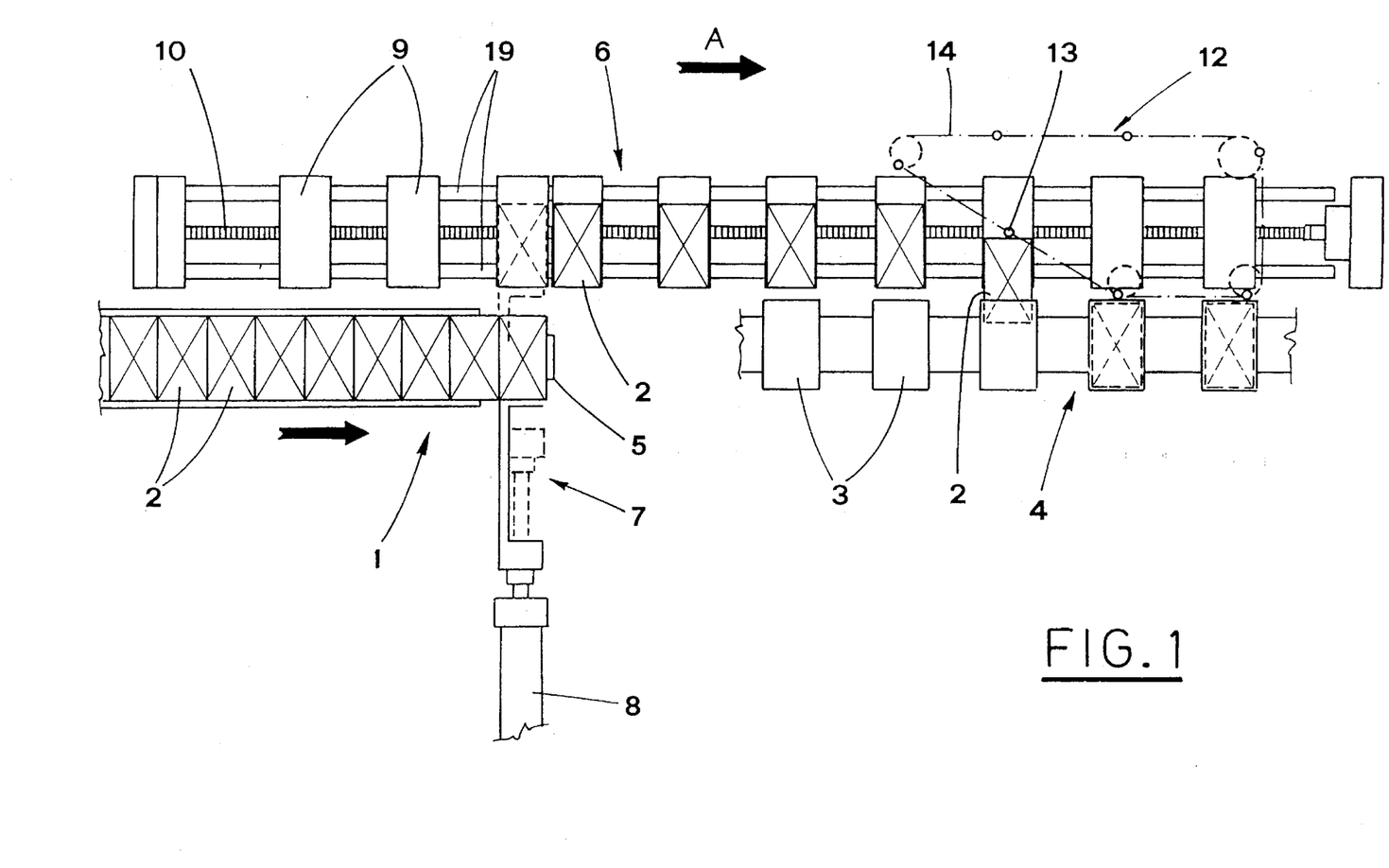
FIG. 1 shows a schematic plan view of the subject device.
Figure 2A:
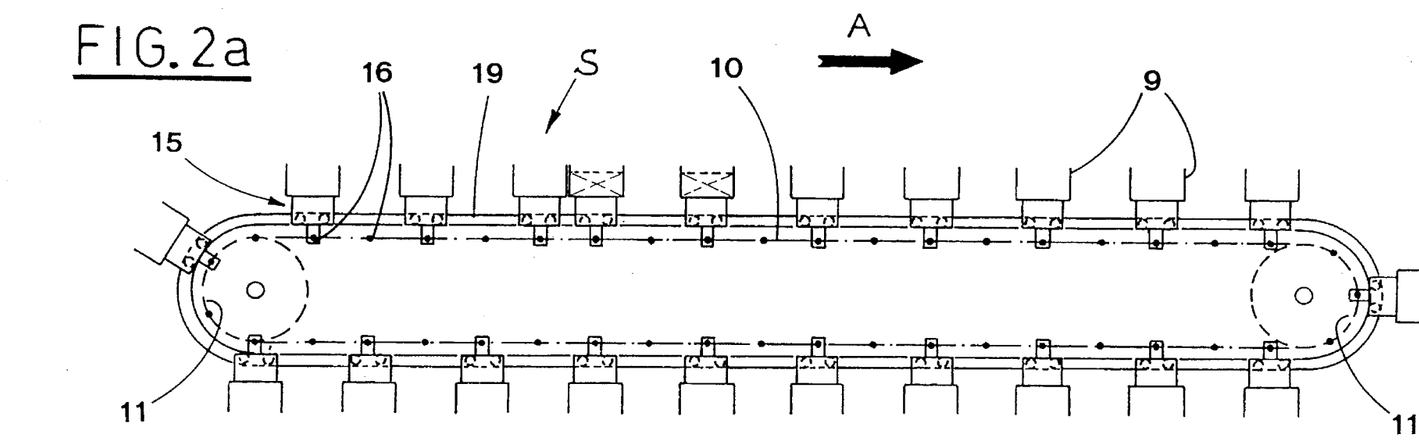
FIG. 2a shows a side view of the same device.

In the loading station, the chain conveyor of the holder being present in the station, that holder being indicated with S in FIG. 2a for clarity's sake, is released by reciprocating operation of the raising means 27.

It is to be noted, as already stated hereinabove, that the holder in position S at the loading station, is adjacent to the holder previously loaded.

In fact, the raising means 27 engage the stem 21 of the connecting means 15 of the above mentioned holder that is in the position S (see FIG. 7) and move it vertically to a raised position, indicated with sketched line 21b in FIG. 5, against the elastic reaction of the springs 22.

Figure 7:
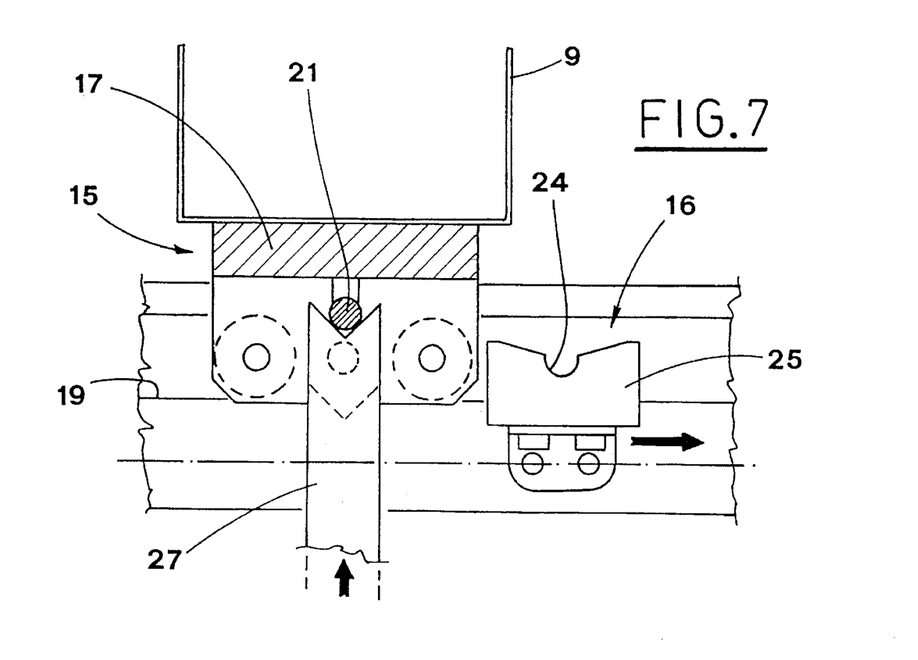
FIG. 7 shows a sectional view taken along the line VII—VII of FIG. 5.

In this way, the holder in position S is released from the relative support 16 fastened to the chain conveyor 10, that keeps on moving continuously along the supplementary transferring line 6 (see again FIG. 7).

The holder in position S is loaded with a respective article 2 by operation of the pusher 7 that reciprocates. Obviously, the means loading the articles 2 in the holders 9 can be other then the ones illustrated in the drawings, according to different needs.

At this point, the raising means 27 return to the lowered position, in order to bring the holder, loaded with a relative article 2, in engagement with a subsequent support 16 of the chain conveyor (FIG. 2).

Figures 2B, 2C:
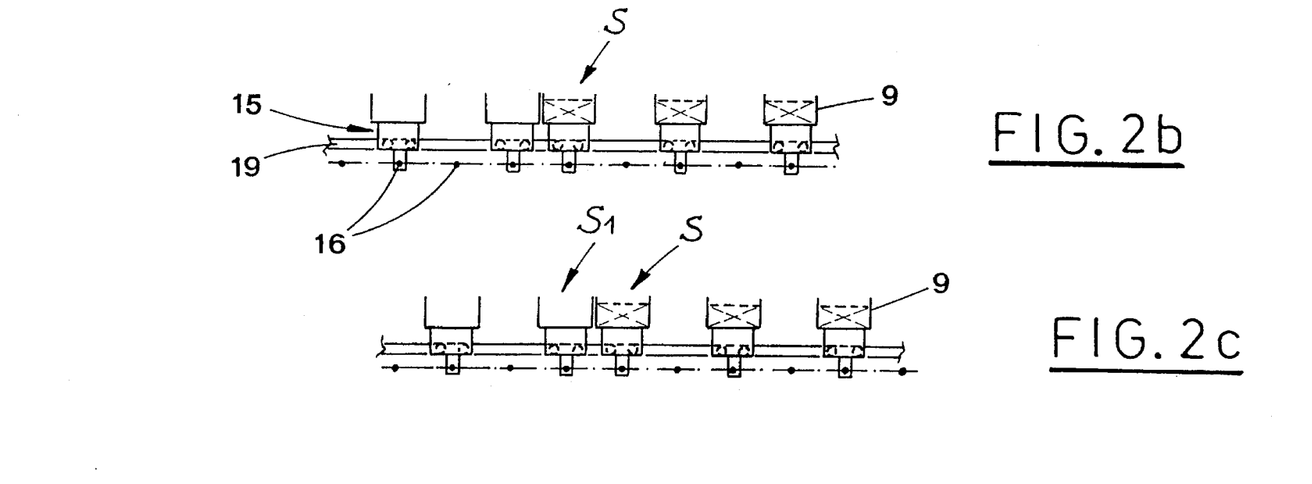
FIGS. 2b and 2c show a fragmentary side of the device view in different working stages.

It is to be pointed out that, when the loading stage is completed, the holder being in the position S is adjacent to the following one, indicated with S1 in FIG. 2c, that is brought to the loading station by the chain conveyor 10.

In other words, the holder to be loaded is temporarily disconnected from the transferring line and stopped in a loading position for a time substantially equal to (i.e. a bit less than) the time comprised between the transit of two adjacent supports 16 of the chain conveyor 10 at the loading station.

This time is long enough to transfer an article 2 from the feeding line 1 to the holder. In this way, the holder is kept motionless while being loaded in the best way, without any interruption in the stepless movement of the line transferring the articles to the packaging line 4.

Figure 8A:
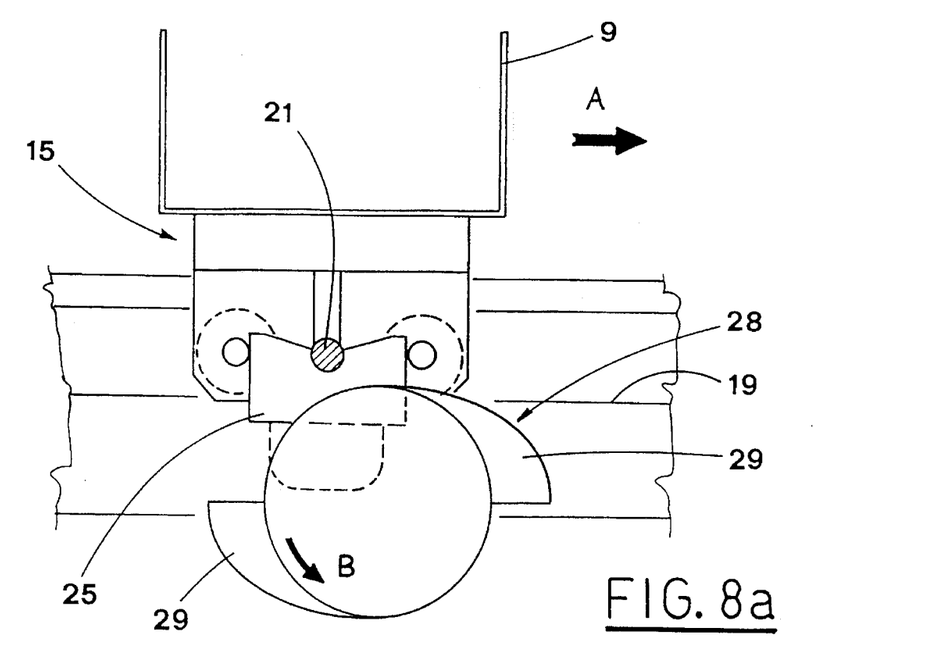
FIGS. 8a and 8b show a different embodiment of the subject device, in different working stages.
Figure 8B:
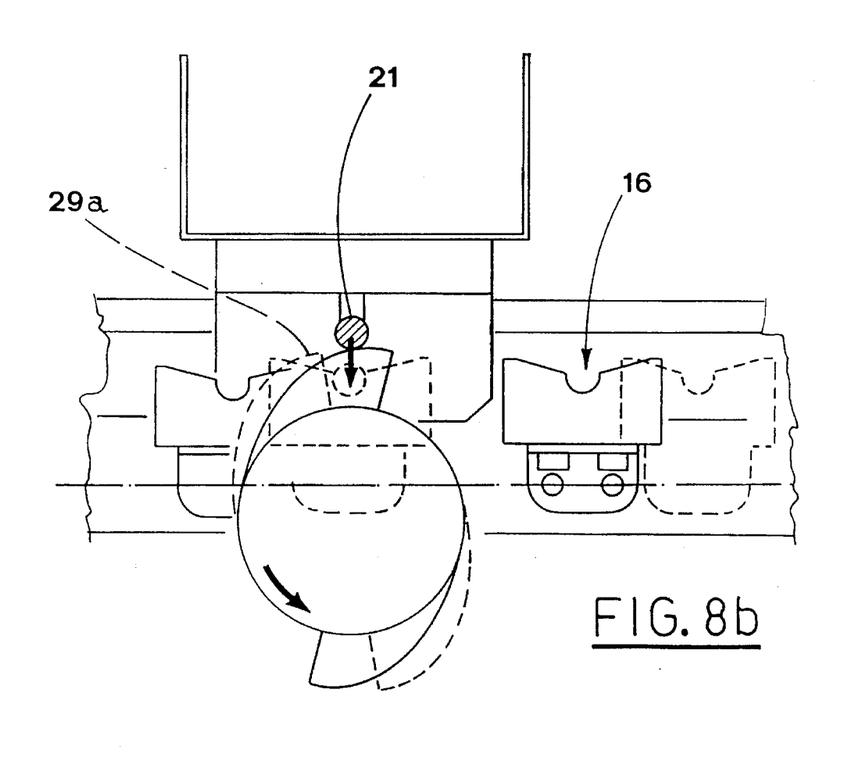

FIGS. 8a and 8b show a different embodiment of the device, in which the holder to be loaded is released from the chain conveyor by a rotating raising element 28.

The rotating raising element 28 is driven so as to rotate in the direction indicated with the arrow B, in suitable phase relation with the movement of the chain conveyor 10.

The rotating raising element 28 features, in diametrically opposite positions, two cams 29, that act progressively on the stem 21 of the connecting means 15 of the holder to be loaded so as to release it from the chain conveyor 10, as seen in FIG. 8b.

It is to be pointed out that the shape of the cams 29 is such to raise gradually the stem 21 of the holder to be loaded and to keep it in raised position for a time slightly shorter than the time necessary for two adjacent supports 16 of the chain conveyor 10 to pass in correspondence of the loading station, i.e. for a time long enough to load the article.

After the loading has been completed, the cams 29 make the stem 21 return rapidly to re-establish the connection with the support 16, as schematically shown with sketched line 29a in FIG. 8b.

Figure 9:
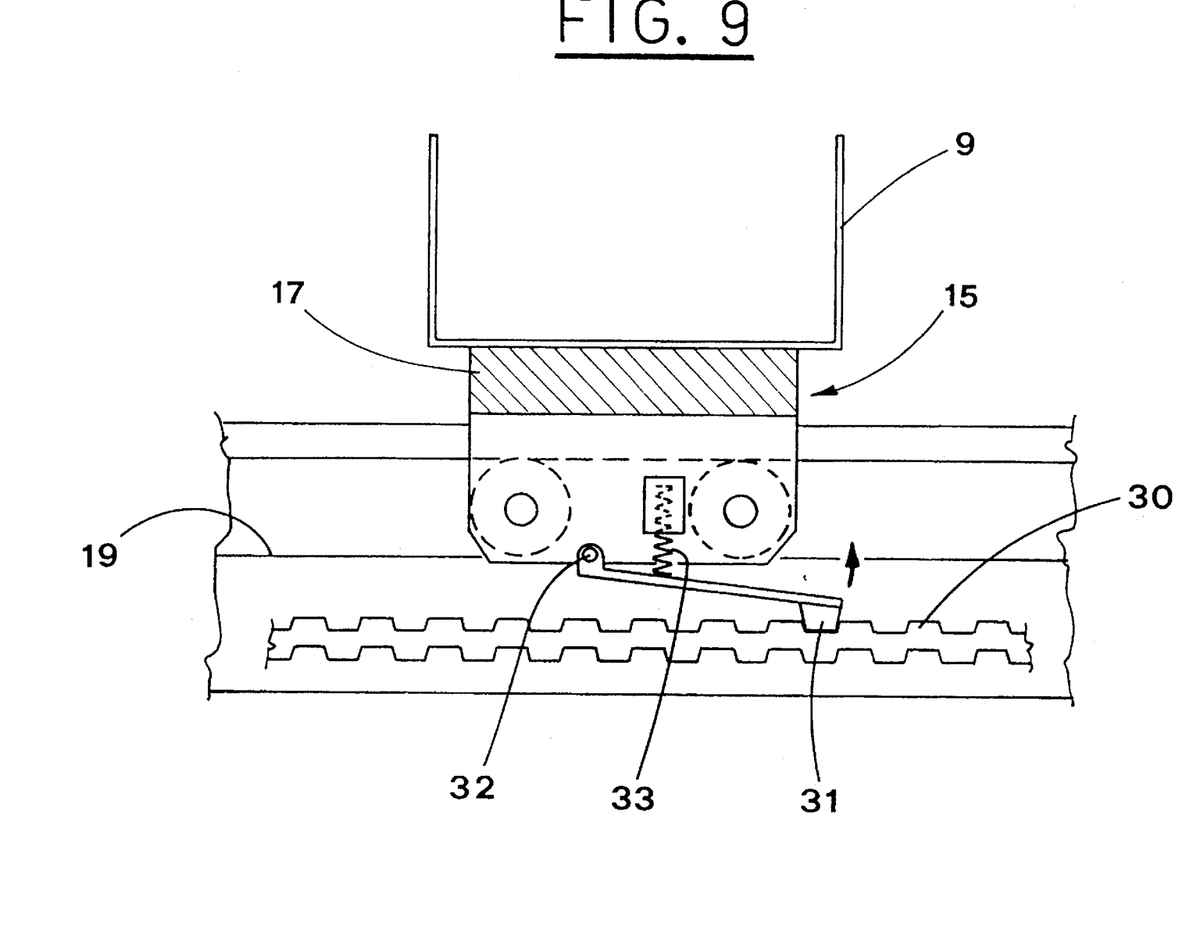
FIG. 9 shows another embodiment of the subject device.

In the solution shown in FIG. 9, the conveying means of the supplementary transferring line 6 is constituted by a belt 30 with double toothing.

The external toothing of the belt 30 engages an anchor 31, pivotally mounted on a pin 32 of the carriage 17, the pin having its axis transversal to the line moving direction; the anchors 31 form the connecting means 15 of the holders 9 respectively.

Each anchor 31 is stressed in the connecting position by springs 33 placed in the carriage 17. Suitable disconnecting means, not shown in the drawing, rotate the anchor 31 angularly when the holder is in the above mentioned loading station, so as to stop it momentarily to be loaded.

Obviously, after the article has been placed in the holder, the anchor 31 is again connected to the belt 30 so as to make the already loaded holder be conveyed along the supplementary transferring line 6. FIGS. 10a, 10b, 10c and 11 show a solution, in which a block 35 slides on a pair of guide stems 34 extending from the carriage 17.

In its lower part, the block 35 has a recess 36 into which a roller 37, fastened to the chain 10, enters. The block 35 is yieldingly pushed by a spring 38 placed inside the carriage 17.

Obviously, also in this case, the holders 9 are regularly spaced apart with a step equal to double distance between two consecutive rollers 37, except for the holder placed in the loading station.

The holder to be loaded is disconnected from the chain conveyor 10 by rotating raising means which include a pair of linked disks 39 rotated intermittently in the direction shown by the arrow C, in a suitable phase relation with the chain conveyor 10 movement.

The disks 39 feature, along their outline, a plurality of indentations 40, angularly spaced apart in regular way. These indentations 40 are aimed at receiving, ill a suitable angular position of the disks, a pair of tangs 41, protruding from both sides of the block 35.

Figure 11:
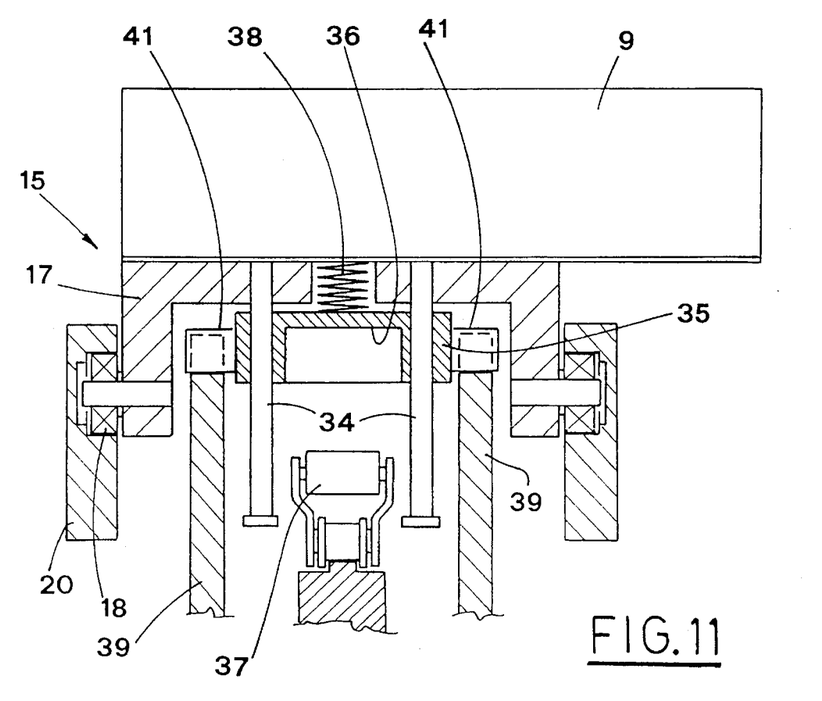

The block 35 is thus raised due to rotation of the disks 39, against the elastic action performed by the spring 38, so as to release the engagement between the holder and the roller 37, and stop the holder momentarily in the loading station (see FIG. 11).

Figure 10A:
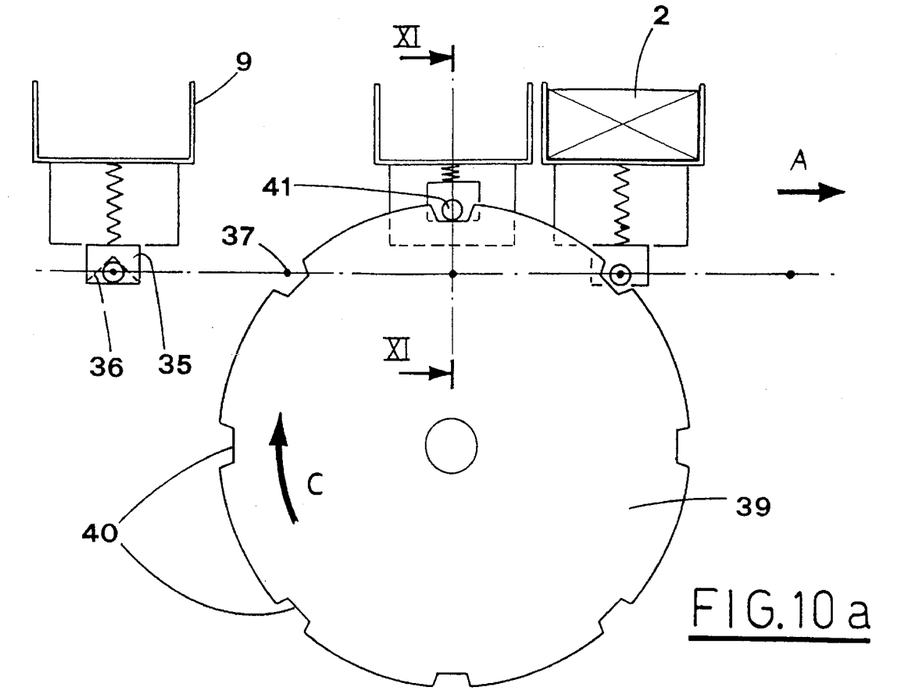
FIGS. 10a, 10b and 10c show still further embodiment of the subject device, in different working stages.
Figure 10B:
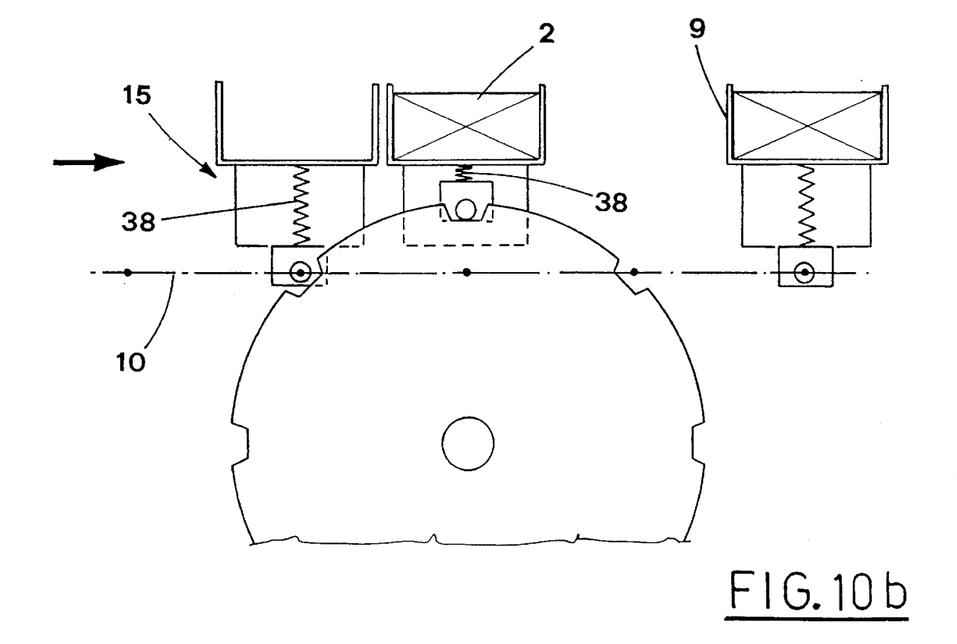
Figure 10C:
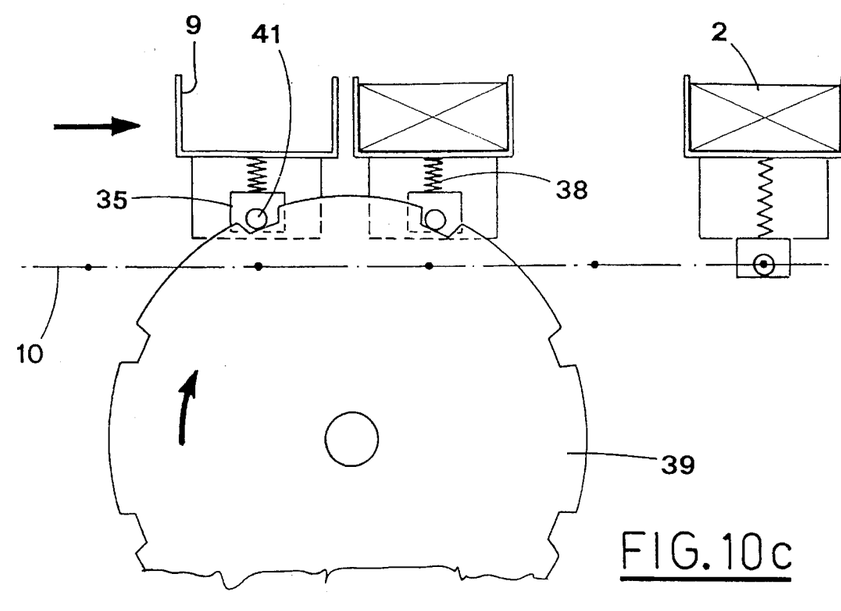

It is to be pointed out that, when the block 35 of holder to be loaded has reached the raised position, subsequent indentations 40 of the disks 39 are ready to receive the tangs of the block of a subsequent holder (FIG. 10a).

When the subsequent holder arrives, the disks 39 are rotated one step further, thus causing disconnection of the last arrived holder from the chain conveyor and, simultaneously, connection of the already loaded holder (FIG. 10c) with the chain conveyor.

The described device allows the articles 2 to be introduced in the best way into the holders 9 of a supplementary line 6 that transfers the same articles to the packaging line 4.

The holders are momentarily disconnected from the conveyor of the transferring line 6, when they are in the loading station, so as to remain motionless therein to be loaded.

Loading of the holders does not interrupt the continuity of the packaging line operation, thus assuring high throughput for the machine.

It is to be pointed out that disconnecting and stopping of each holder to be loaded are carried out in such a way that the holders remain regularly spaced apart along the line.

Moreover, engagement and disengagement are gradual that results in reduction of stresses and consequently, improves the performance of the device.

What is claimed is:

1. A device for feeding articles to a line for packaging into containers, comprising:

a continuously moving supplementary line for receiving articles frown a feeding line and transferring received articles to a packaging line, said supplementary line having a conveying means including a chain conveyor, guides extending along the sides of said supplementary line, and a loading station located at a position along said supplementary line;

a plurality of supports, said supports being fastened to said chain conveyor and spaced equidistantly along said chain conveyor, each of said supports having a groove therein;

a plurality of article carrier holders, said carrier holders being disposed on said guides for movement thereal-ong;

connecting means mounted on each carrier holder for removably connecting each of said carrier holders to a support, each of said connecting means including a transverse stem, said stem being mounted for sliding motion in a direction orthogonal to said guides, each stem being slidable between an engaged position in which said stem is engaged in a groove of said support and an elevated position in which said stem is disengaged from said groove; and raising means mounted at said loading station and engageable with said stem for raising and releasing said connecting means from said support and for holding said carrier holder stationary at said loading station, wherein a carrier holder located at said loading station is disconnected from the chain conveyor for a time substantially equal to the time necessary for a subsequent support to reach said loading station, and is then re-connected to said chain conveyor.

2. A device according to claim 1, wherein said raising means includes a member rotatable in a direction opposite a direction of movement of said carrier holders, said rotatable member including cams engageable with said connecting means to disconnect said connecting means from said conveying means.

3. A device according to claim 1, wherein each of said connecting means includes a pair of tangs protruding from opposite sides of said connecting means, said raising means including a rotary member formed by a pair of disks linked to each other and rotated in step in a time relation with said conveying means, said disks having a plurality of angularly spaced indentations at the periphery thereof for receiving said tangs.

4. A device according to claim 1, wherein the carrier holders are spaced apart with a distance that is twice a distance between two consecutive supports, except that a carrier holder at said loading station will be adjacent a previous carrier holder at said loading station during disconnection from said conveying means.

5. A device according to claim 1, wherein said connecting means includes a carriage fixed to a lower surface of each carrier holder, said carriage being slidingly guided along said guides of said supplementary line, each carriage having a block attached thereto, said block having a recess in a lower surface thereof, said conveying means having a roller engageable with said recess of said block.

6. A device for feeding articles to a line for packaging into containers, comprising:

a continuously moving supplementary line for receiving articles from a feeding line and transferring received articles to a packaging line, said supplementary line having a conveying means including a chain conveyor, guides extending along the sides of said supplementary line, and a loading station located at a position along said supplementary line;

a plurality of supports, said supports being fastened to said chain conveyor and spaced equidistantly along said chain conveyor;

a plurality of article carrier holders, said carrier holders being disposed on said guides for movement thereal-ong;

connecting means mounted on each carrier holder for removably connecting each of said carrier holders to conveying means, each of said connecting means including a carriage fixed to a lower portion of each carrier holder, said carriage being slidingly guided along said guides of said supplementary line, said carriage having engagement means and elastic means, said engagement means being biased downwardly by said elastic means to engage said conveying means;

raising means mounted at said loading station for raising and releasing said connecting means from said support and for holding said carrier holder stationary at said loading station, wherein a carrier holder located at said loading station is disconnected from the chain conveyor for a time substantially equal to the time necessary for a subsequent support to reach said loading station, and is then re-connected to said chain conveyor.

7. A device according to claim 6, wherein said raising means includes a member rotatable in a direction opposite a direction of movement of said carrier holders, said rotatable member including cams engageable with said connecting means to disconnect said connecting means from said conveying means.

8. A device according to claim 6, wherein each of said connecting means includes a pair of tangs protruding from opposite sides of said connecting means, said raising means including a rotary member formed by a pair of disks linked to each other and rotated in step in a time relation with said conveying means, said disks having a plurality of angularly spaced indentations at the periphery thereof for receiving said tangs.

9. A device according to claim 6, wherein the carrier holders are spaced apart with a distance that is twice a distance between two consecutive supports, except that a carrier holder at said loading station will be adjacent a previous carrier holder at said loading station during disconnection from said conveying means.

10. A device according to claim 6, further comprising a block attached to said carriage, said block having a recess in a lower surface thereof, said conveying means having a roller engageable with said recess of said block.

11. A device for feeding articles to a line for packaging into containers, comprising:

a continuously moving supplementary line for receiving articles from a feeding line and transferring received articles to a packaging line, said supplementary line having a conveying means including a toothed belt conveyor, guides extending along the sides of said supplementary line, and a loading station located at a position along said supplementary line;

a plurality of supports, said supports being fastened to said conveyor and spaced equidistantly along said conveyor;

a plurality of article carrier holders, said carrier holders being disposed on said guides for movement thereralong;

connecting means mounted on each carrier holder for removably connecting each of said carrier holders to said conveying means, said connecting means including an anchor pivotally mounted on said carrier holder and spring means for downwardly biasing said anchor into engagement with said toothed belt; and raising means mounted at said loading station for raising and releasing said connecting means from said support and for holding said carrier holder stationary at said loading station, wherein a carrier holder located at said loading station is disconnected from the conveyor for a time substantially equal to the time necessary for a subsequent support to reach said loading station, and is then reconnected to said conveyor.

12. A device according to claim 11, wherein said raising means includes a member rotatable in a direction opposite a direction of movement of said carrier holders, said rotatable member including cams engageable with said connecting means to disconnect said connecting means from said conveying means.

13. A device according to claim 11, wherein each of said connecting means includes a pair of tangs protruding from opposite sides of said connecting means, said raising means including a rotary member formed by a pair of disks linked to each other and rotated in step in a time relation with said conveying means, said disks having a plurality of angularly spaced indentations at the periphery thereof for receiving said tangs.

14. A device according to claim 11, wherein the carrier holders are spaced apart with a distance that is twice a distance between two consecutive supports, except that a carrier holder at said loading station will be adjacent a previous carrier holder at said loading station during disconnection from said conveying means.

15. A device according to claim 11, wherein said connecting means includes a carriage fixed to a lower surface of each carrier holder, said carriage being slidingly guided along said guides of said supplementary line, each carriage having a block attached thereto, said block having a recess in a lower surface thereof; said conveying means having a roller engageable with said recess of said block.

* * * * *